(12) United States Patent
Ronchi

(10) Patent No.: US 6,345,713 B1
(45) Date of Patent: Feb. 12, 2002

(54) AUTOMATIC MACHINE FOR OVERTURNING CONTAINERS AND THE LIKE

(75) Inventor: Mario Ronchi, Cologno Monzese (IT)

(73) Assignee: Ronchi Mario S.r.l., Cologno Monzese (IT)

( * ) Notice: Subject to any disclaimer, the term of this patent is extended or adjusted under 35 U.S.C. 154(b) by 0 days.

(21) Appl. No.: 09/497,632

(22) Filed: Feb. 3, 2000

(30) Foreign Application Priority Data

Oct. 2, 1999 (IT) .......................................... MI99A0253

(51) Int. Cl.⁷ .............................................. B65G 29/00
(52) U.S. Cl. ............................. 198/377.03; 198/377.07; 198/414
(58) Field of Search ....................... 198/377.03, 377.07, 198/377.1, 414

(56) References Cited

U.S. PATENT DOCUMENTS

| | | | |
|---|---|---|---|
| 2,415,997 A | | 2/1947 | Eldred |
| 2,551,011 A | * | 5/1951 | Kantor .............. 198/377.07 X |
| 3,127,210 A | * | 3/1964 | Schreiber ........... 198/377.03 X |
| 3,770,098 A | * | 11/1973 | Baugnies et al. ...... 198/377.03 |
| 3,847,273 A | * | 11/1974 | Buhayar ................ 198/377.07 |
| 4,938,337 A | * | 7/1990 | Jowitt et al. ........... 198/377.03 |

FOREIGN PATENT DOCUMENTS

| | | | |
|---|---|---|---|
| EP | 0857671 | 8/1998 | |
| FR | 2395081 | 1/1979 | |
| GB | 1264622 | * 2/1972 | ............ 198/377.03 |
| GB | 1466067 | 3/1977 | |
| GB | 1483583 | 8/1977 | |

* cited by examiner

Primary Examiner—James R. Bidwell
(74) Attorney, Agent, or Firm—Ladas & Parry

(57) ABSTRACT

The invention relates to a machine for overturning containers such as bottles having a bottom which is not flat. The machine has a fixed base which supports rotational movement of devices for gripping/releasing, raising/lowering, and overturning the containers. Sensors are used for controlling and actuating the corresponding operating sequences associated with each device.

16 Claims, 4 Drawing Sheets

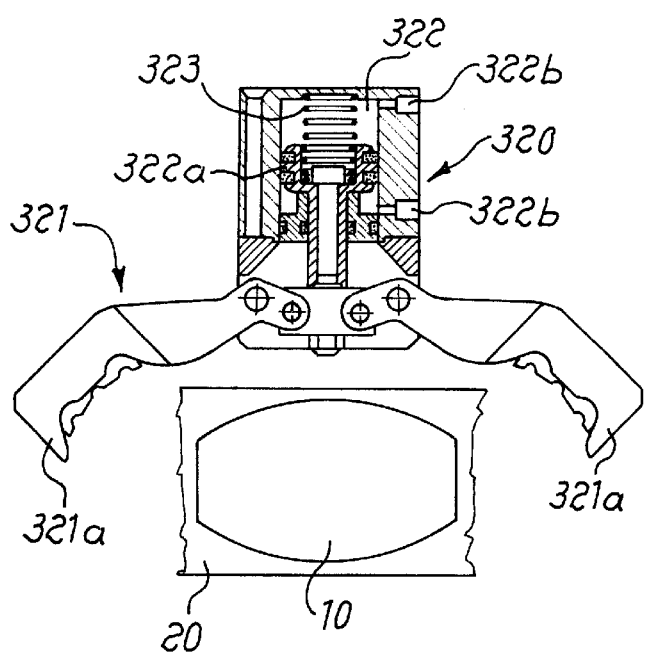
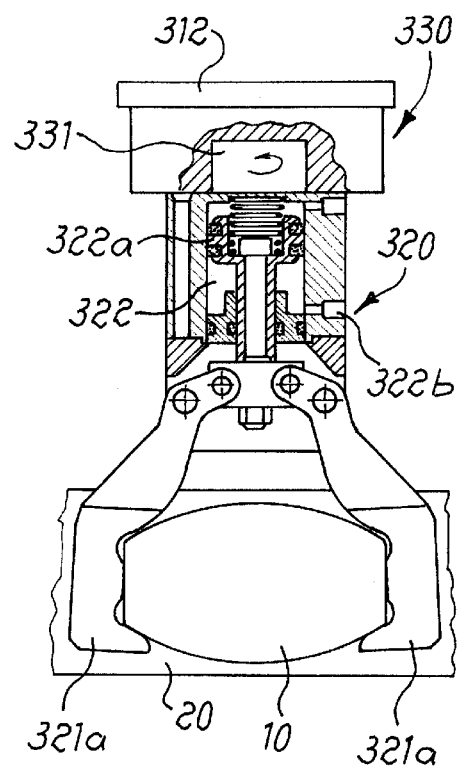
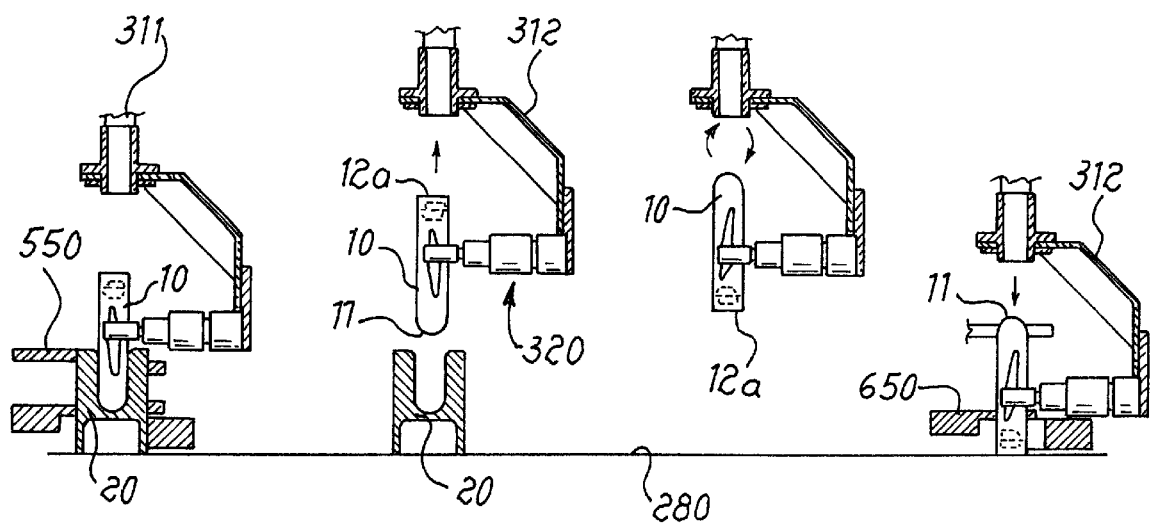

AUTOMATIC MACHINE FOR OVERTURNING CONTAINERS AND THE LIKE

DESCRIPTION

The present invention relates to a machine for overturning containers such as bottles having a bottom which is not flat and the like.

It is known in the art of filling and sealing containers with various shapes that there exists the need also to fill those containers which have a shape without a flat bottom suitable for keeping them in an erect position during displacements on conveying devices which bring the opening of the container opposite the nozzles for filling said container and opposite the devices for applying the stopper.

In order to overcome the problem associated with the lack of a flat bottom, the containers are therefore inserted into specials supports which are substantially parallelepiped and which have an internal seat corresponding to the shape of the container and the associated bottom so that the support/container -assembly may be fed towards the filling machine, inside which the container, still carried by the associated support, is filled and sealed with a stopper and unloaded from the machine for the subsequent packaging operations, before performing which operations the container must be separated from its support which is in turn recycled and brought back to the loading station or to an associated store.

The technical problem which is posed, therefore, is that of providing an automatic apparatus for application to conventional lines for filling and packaging containers such as bottles and the like, in particular those without a flat bottom, which is designed to remove a container from an associated support, overturn it through 180° and feed it to the conveyors belts (or similar conveying devices) on which it rests at its end with the stopper which has a flat upper surface suitable for acting as a base for the overturned container, thus allowing conveying thereof without the need for an auxiliary support.

These technical problems are solved according to the present invention by a machine for overturning containers and the like which comprises a fixed base supporting movement means, movable along a closed path, for said containers, in which devices for gripping/releasing, raising/lowering, in a direction substantially perpendicular to the direction of movement, and overturning the bottles are integrally joined to the said movement means, means for controlling and actuating the corresponding operating sequences being associated with said means.

Further details may be obtained from the following description of a non-limiting example of embodiment of the invention provided with reference to the accompanying drawings, in which:

FIGS. 5a, 5b show a partially sectioned, plan view of the devices for gripping the bottle together with associated actuating means during opening and gripping, respectively; and FIG. 6 shows schematic views of the working sequence of the machine according to the invention.

Figure 1:
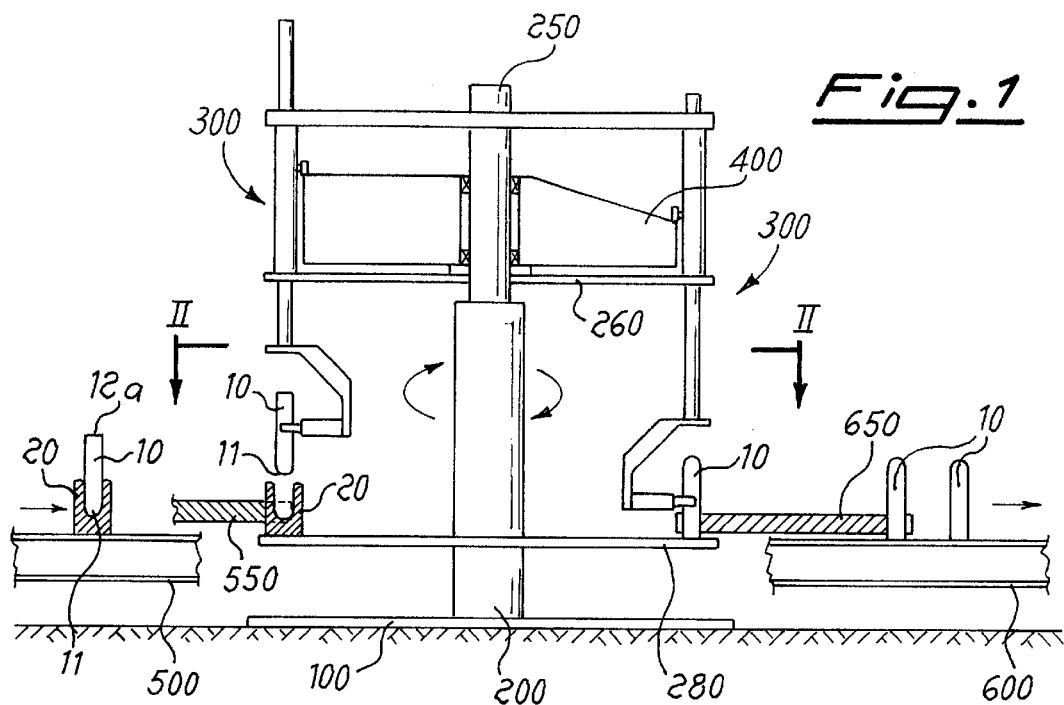
FIG. 1 shows a schematic front view of the machine according to the invention.
Figure 2:
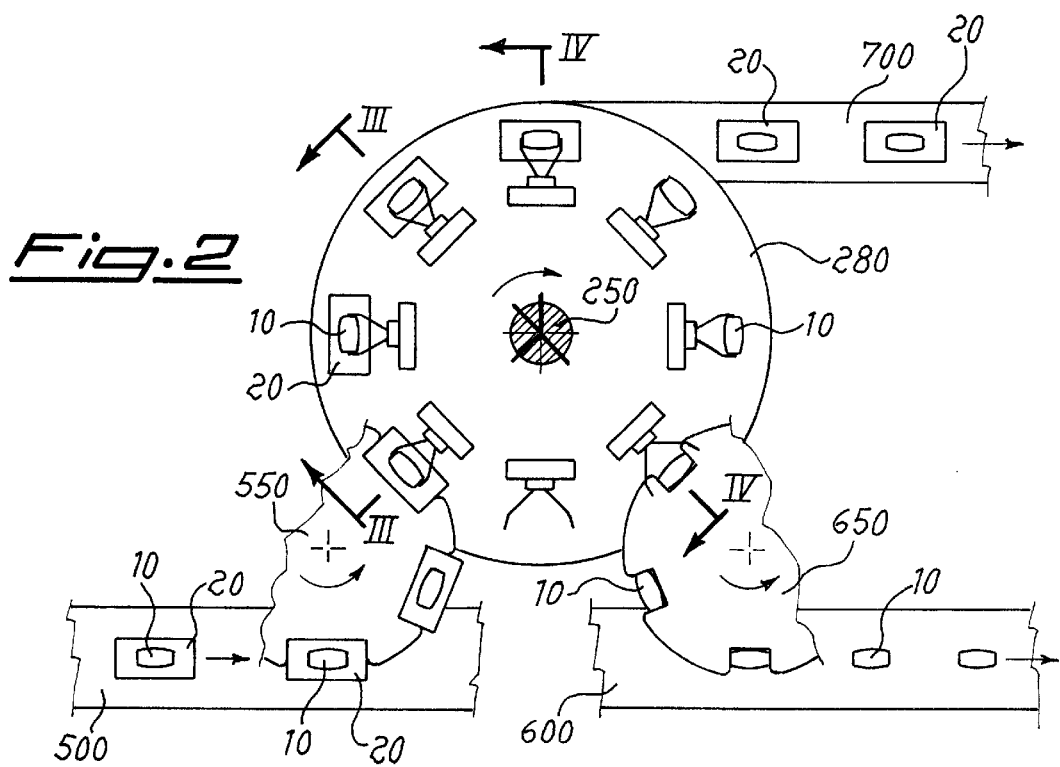
FIG. 2 shows a cross-section along the plane indicated by II—II in FIG. 1.

As illustrated, the machine according to the invention is composed essentially of a fixed base 100 on which a fixed upright 200 is mounted, the latter having, coaxially inserted inside it, a rotating column 250 on which the following are coaxially mounted:

a bottom plate 280 and a top plate 260 rotating with the column;

the top plate 260 carries in turn the devices 300 for handling the bottles 10 which, in the example, are formed with a rounded bottom 11 and a stopper 12 having a flat upper surface 12a;

a fixed cam 400 suitably provided with an ascending ramp 400a, a flat section 400c and a descending ramp 400b.

The following are also associated with the machine: a conveyor belt 500 for feeding the bottles 10 which are contained in associated supports 20 and supplied from a filling machine (not shown), means 550 for inserting the supports into the machine, a conveyor belt 600 for conveying away the overturned bottles 10, means 650 for pushing the bottles onto said belt 600, a conveyor belt 700 for recycling the supports to the filling machine, not shown.

Figure 3:
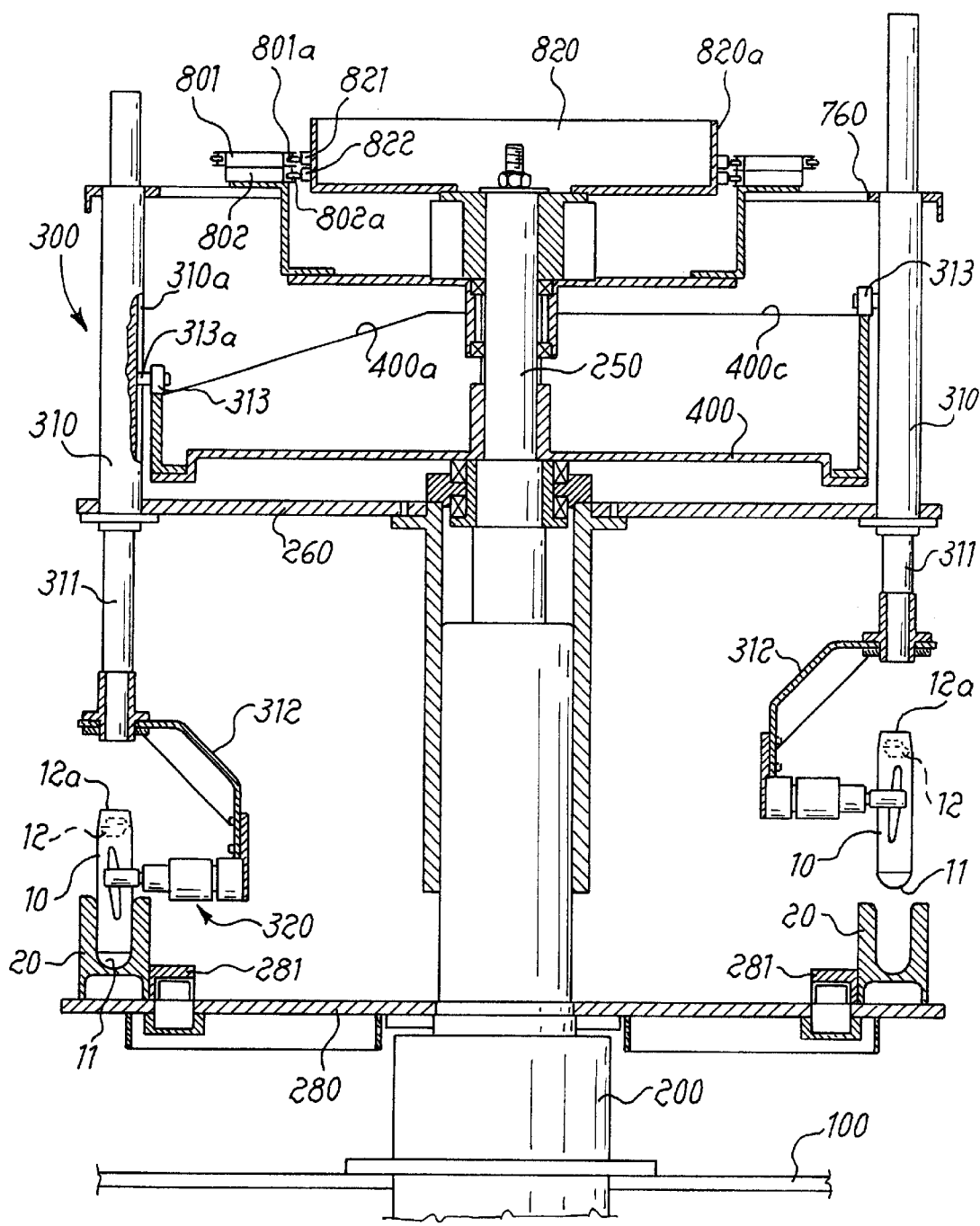
FIG. 3 shows a cross-section along the plane indicated by III—III in FIG. 2, illustrating the steps for removing and raising a bottle.
Figure 4:
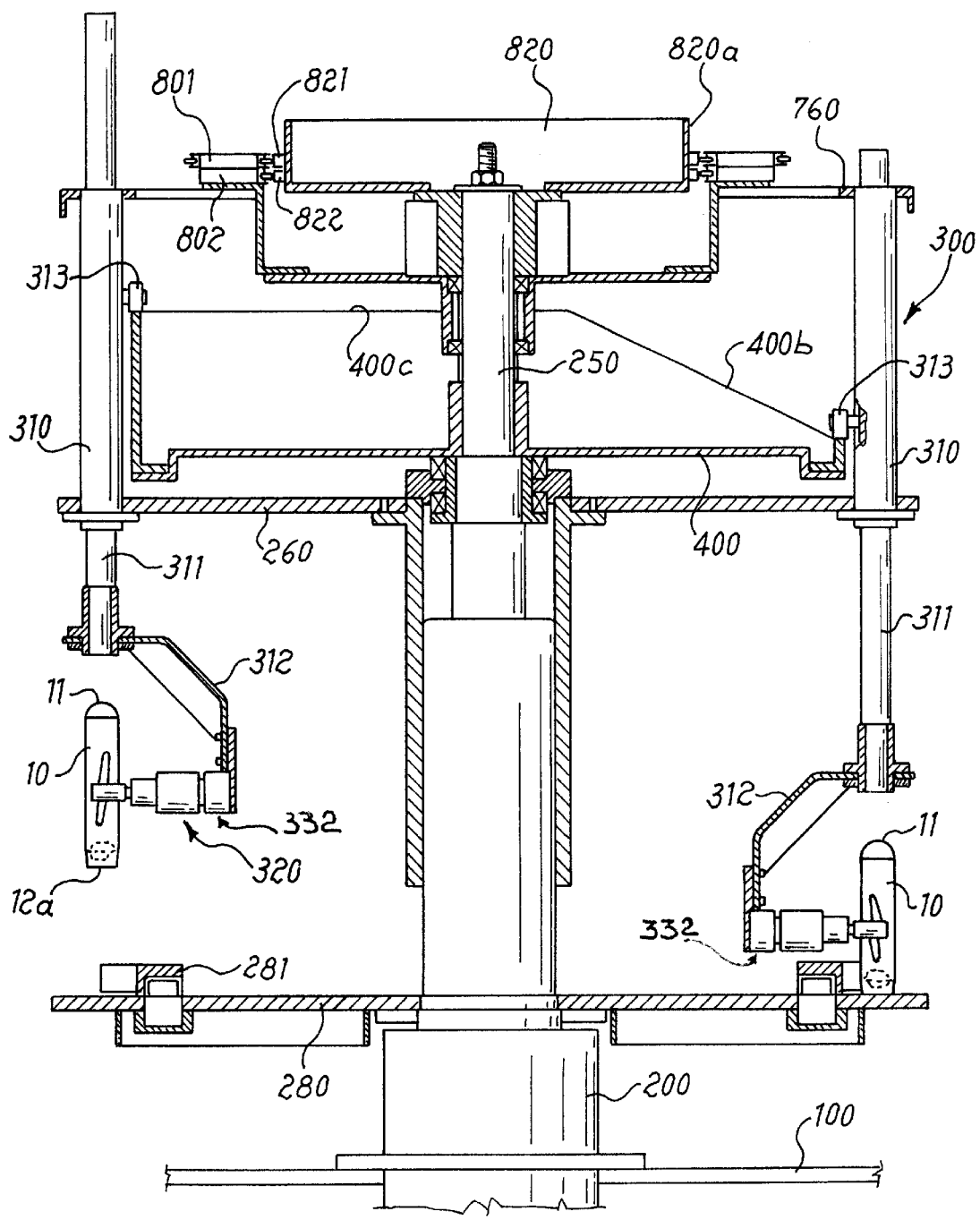
FIG. 4 shows a cross-section along the plane indicated by IV—IV in FIG. 3, illustrating the steps for overturning and depositing the bottle.

More particularly (FIG. 3) the devices 300 for gripping and handling the bottles 10 consist of guides 310 which are integrally joined to the plate 260 rotating together with the column 250 and which have, sliding inside them, a sliding member 311 which has at its free end a shaped arm 312 on which the means 320 for gripping and overturning the bottle 10 are mounted.

Said gripping means 320 (FIGS. 5a,5b) consist of a gripper 321, the jaws 321a of which are opened (Fig. 5a) and closed (FIG. 5b) by means of a cylinder 322, piston 322a of which is normally kept pushed outwards by a spring 323 so as to ensure a stable condition of the open jaws 321a.

By suitably supplying the cylinder by means of the associated valves 322b, the piston is pushed inwards, overcoming the resistance of the spring 323 and causing closing of the jaws 321a around the bottle 10; when the cylinder is discharged, the spring 323 moves the piston outwards again and causes the jaws to open.

The entire jaw group 320 is in turn mounted by means of a pivot 331 on a rotating piston 332 which is integral with the arm 312.

The fixed annular cam 400 is also mounted coaxially with the column 250, said cam having, rolling along its shaped profile, rollers 313, the hub 313a of which is inserted inside a longitudinal eyelet 310a of the guide 310 and integrally joined to each sliding member 311 sliding inside the said guide 310.

In this way, as will be explained below, the cam 400 causes, during rotation of the plate 260, the correct and synchronised sequence of raising/lowering of the sliding members 311 of the means 300 for handling the containers 10.

A ring 820 is mounted coaxially on the top end of the column 260, said ring having formed along its annular edge 820a two cam profiles 821 and 822 along which rollers 801a,802a associated with sensors 801,802 travel, the latter being attached to a disc 760 which is coaxially mounted on the column 250 and attached to each guide 310 of the devices 300 for handling the bottle 10, together with which it rotates.

Said sensors 801,802 are connected to the devices (known per se and therefore not shown) for controlling and actuating the working sequence of the machine and respectively designed to send enable signals for closing/opening and rotating the gripper 320 for gripping the bottle 10.

The operating principle of the machine is as follows (FIG. 6):

- the bottles 10 contained inside the associated supports 20 are fed to the machine by means of conveyor belt 500;
- once they reach the entry zone, the supports 20 are inserted into the machine and brought into abutment with guides 281 by means of a rotating star-wheel 550;
- rotation of the plate 100 brings the rollers 313 to the bottom of the descending ramp 400a of the cam 400 and therefore the sliding member 311 into the lowered position with the gripper 320 in position for gripping the container;
- the sensors 801 reach the cam zone 821 which causes closing thereof, enabling subsequent closing of the grippers 321 around the bottle 10;
- the bottle 10 is gripped and rotation of the column 250 causes the rollers 313 to rise up along the rising profile 400a of the cam 400, causing raising of the sliding member 311 and therefore the container 10;
- the sensor 802, rotating on the cam 822, closes and enables rotation of the base 331 of the gripper 321 about its axis, causing the corresponding overturning of the container 10;
- continuing its continuous rotation, the column 250 and the bottom plate 280 integral therewith bring respectively each arm 312 into the zone for unloading the bottle 10 and the supports 20 into the zone for discharging from the machine and entry onto the belt 700 for return to the filling machine;
- when the zone for unloading the bottles 10 is reached, the rollers 313 travel down the descending ramp 400b of the cam 400, causing the descent of the sliding member 311, and, simultaneously and in synchronised sequence, the associated sensor 801 reaches the corresponding cam zone 821 which causes opening of the gripper 321 and the consequent deposition of the bottle 10 onto the bottom plate 280 on which it stands upright, resting on the flat surface 12a of the stopper 12;
- the bottles 10 are removed from the unloading zone by a rotating star-wheel 650 and are pushed onto the conveyor belt 600 which conveys the bottles away for subsequent processing.

Although described in connection with the specific application for overturning containers without a flat bottom, it is obvious that the machine according to the invention may also be used for overturning containers with a flat bottom to be selected, for example, for unloading in different directions: in this case it is possible, for example, for some containers (overturned or not overturned) to continue, being carried by the plate 280, towards the belt 700, while other containers removed by the gripping means 320 (overturned/not overturned) are transported towards the belt 600, selection being determined by the correct use of the control and actuating means and the correct timing of the cycle times.

What is claimed is:

1. A machine for overturning containers which comprises: a fixed base supporting movement means movable along a closed path for said containers; devices for gripping/releasing, raising/lowering in a direction substantially perpendicular to the direction of movement, and overturning said containers, integrally joined to said movement means; and pairs of sensors for controlling and actuating the corresponding operating sequences being associated with said movement means and said devices.

2. A machine according to claim 1, wherein it is of the rotating type.

3. A machine according to claim 1, wherein said movement means consists of a rotating column, coaxially with which a bottom plate rotating with the column is mounted.

4. A machine according to claim 3, wherein a top plate which carries said devices is mounted on said rotating column.

5. A machine according to claim 1, wherein said device for gripping/releasing consists of a gripper which can be actuated so as to open/close by associated means.

6. A machine according to claim 5, wherein said means for actuating the gripper consists of a cylinder which is designed to cause displacement of an associated piston against the thrusting action of a resilient means so as to close the gripper.

7. A machine according to claim 1, wherein said device for gripping/releasing is associated with said device for overturning.

8. A machine according to claim 7, wherein said device for overturing consists of a rotating piston.

9. A machine according to claim 4, wherein said device for raising/lowering the containers consists of a guide on which a sliding member carrying the gripping means is movable.

10. A machine according to claim 9, wherein said guide has a longitudinal slit.

11. A machine according to claim 10, wherein the hub of a roller co-operating with the device for raising/lowering the sliding member is movable longitudinally inside the slit.

12. A machine according to claim 3, wherein said device for raising/lowering consists of the profile of an annular cam which is coaxially mounted, idle, on the rotating column.

13. A machine according to claim 1, wherein it is associated with means for conveying away overturned containers.

14. A machine according to claim 3, wherein said sensors are mounted, fixed, on a disc coaxially mounted on the column and rotating together with the latter.

15. A machine according to claim 3, wherein said sensors have an activation device acting on the profile of a respective, fixed, annular cam coaxially mounted, idle, on the column.

16. A machine according to claim 1, wherein it is associated with means for feeding the containers.

* * * * *